UNITED STATES PATENT OFFICE.

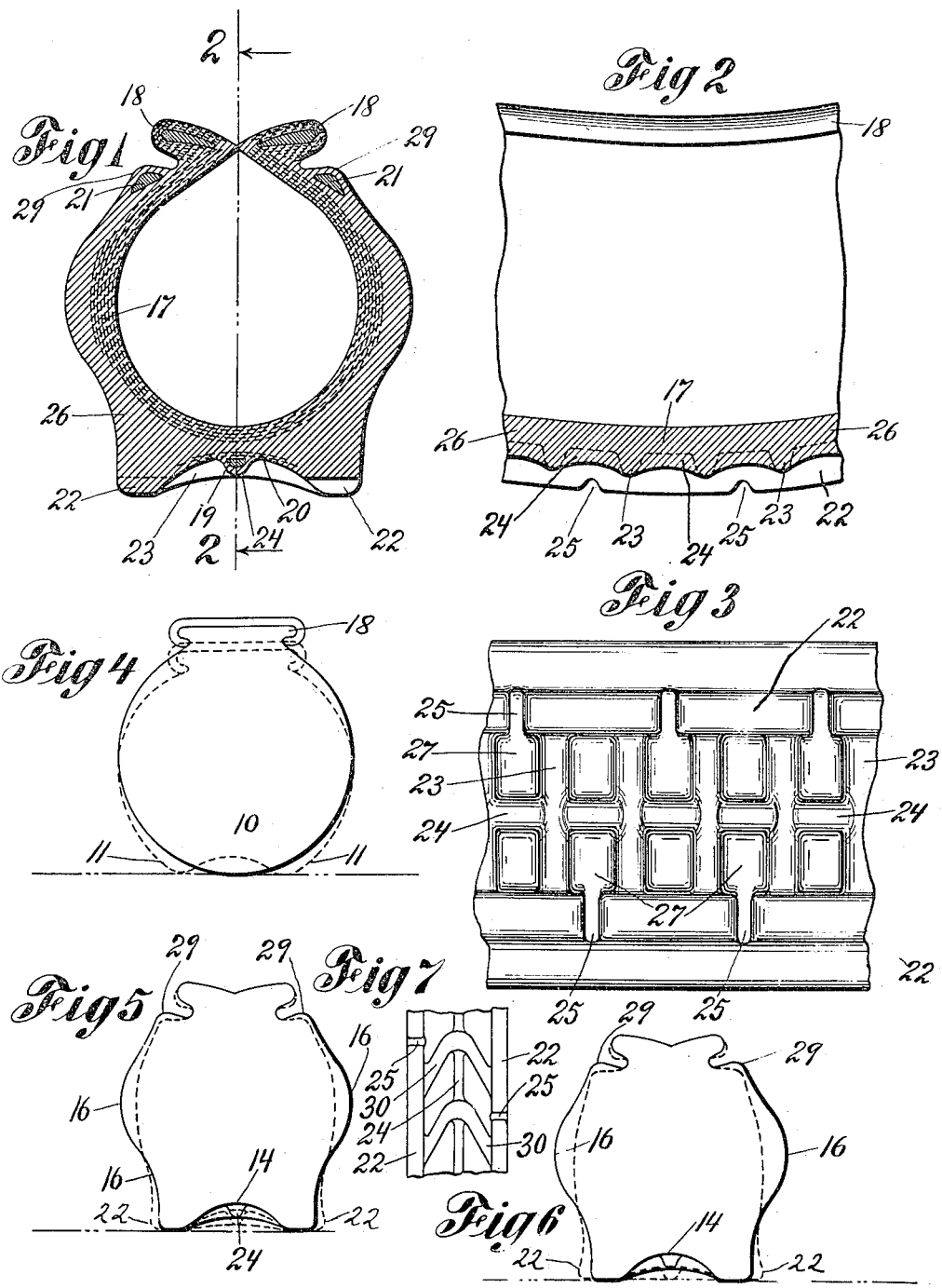

OSCAR MUSSINAN, OF NEW YORK, N. Y.

VEHICLE-TIRE.

1,091,379.

Specification of Letters Patent. Patented Mar. 24, 1914.

Application filed September 3, 1913. Serial No. 787,909.

*To all whom it may concern:*

Be it known that I, OSCAR MUSSINAN, a citizen of the United States, and a resident of New York city, State of New York, have invented certain new and useful Improvements in Vehicle-Tires, of which the following is a specification.

The invention relates to vehicle tires, and particularly to tires for automobiles and the like, and one of its objects is to provide a tire which shall be sufficiently resilient and yielding to compression and at the same time more durable and less liable to deformation in shape under load and less apt to blow out than are the tires now in use.

The invention consists in the novel construction, arrangement and combination of elements and features forming a tire adapted to attain the objects of my invention, as illustrated in the accompanying drawings and fully described in the following specification.

In the accompanying drawings, Figure 1 is a transverse sectional view of a tire constructed according to my invention, Fig. 2 is a longitudinal sectional view of a portion of such a tire taken on the line 2—2 of Fig. 1; Fig. 3 is a plan view of a portion of the face of such a tire, Figs. 4, 5 and 6 are diagrammatic views hereinafter described, and Fig. 7 is a plan view of a portion of the face of a tire showing in part a modification of the invention.

As is well known in the art, it has been found necessary in automobile construction, in order to produce an easy riding vehicle and particularly to prevent undue jarring of the motor, to provide tires having a considerable cushioning or shock-absorbing effect. Such tires are usually made of rubber, and two types of the same are well known, namely, cushion tires and pneumatic tires. The advantages of each of these types are well understood, and both types possess serious disadvantages which are well known.

In my invention I have sought to combine the advantages of these two types of tires, and to obviate the disadvantages, by combining the strength and durability of the cushion tire with the elasticity and resiliency of the pneumatic tire. I have particularly sought to devise a tire of such construction that the various stresses therein when under normal load, and more particularly when under excessive load, shall tend to as it were neutralize each other, and to throw the tire into such a form as to best resist such stresses, and I have particularly sought to provide means whereby the tire shall not be subject to undue deformation in shape and to the special stresses which frequently result in a rupture or "blow-out." These and various other objects of the invention and the means by which I seek to attain same are now to be set forth.

In order to make clear the stresses to which an ordinary pneumatic tire, and a tire constructed according to my invention, when under load, are subjected, and the behavior of said tires under such stresses, I have prepared the diagrammatic views which form Figs. 4, 5, and 6 of the accompanying drawings. Fig. 4 represents the cross-section of an ordinary pneumatic tire, the full lines showing its normal cross-section, and the dotted lines the form it assumes when under load; while Figs. 5 and 6 show in the same manner the form taken by my improved tire, Fig. 5 showing in dotted lines its form when under moderate load and Fig. 6 in dotted lines its form when under a load somewhat excessive (it will be understood that in Fig. 1 of the drawings my improved tire is shown in cross-section when under no load).

It will be observed that in the case of an ordinary tire as shown in Fig. 4, there is a tendency for the middle part of the tread 10, first to flatten against the road-bed, and then to buckle upward or inward, as shown by the dotted lines in the said Fig. 4. This results from the bulging outward of the lower side portions, 11, which is caused by the outward pressure of the compressed air inside the tire. As is shown in Figs. 5 and 6, however, in a tire constructed according to my invention, the contrary action takes place. In this form of tire the edges of the wheel rim rest upon a circumferentially extending shoulder 29 on each side of the tire, bringing the line of stress resulting from the load as far out to the side as possible, and the bearing surface of the tire is provided with circumferentially extending treads 22 lying approximately under the shoulders 29. As the center part 14 of the bearing surface is normally arched or lifted above the road-bed and strengthened or reinforced by a system of arched ribs or ridges, and as the pressure of the inclosed air, when the tire is under load, tends to press the central part of the tread down toward the roadbed more or less as shown in Figs. 5 and 6, thus tending to force inward the side portions 16 of the tire, the side portions between the shoulders 29 and treads 22 tend to become straight. This relative movement of the bearing surface and side portions results from the semi-rigid character of the fabric of the tire.

It will be observed that in a tire constructed according to my invention, the change of form which takes place under load is such as to make the side portions straighter and more into perpendicular and to place them more in a proper position to sustain the downward stresses due to the weight of the load, in other words to cause the tire to approach more nearly the "cushion" type. In the ordinary tire, on the contrary, the change of form induced by the pressure of the load, as shown by the dotted lines in Fig. 4, is such as to throw the side portions of the tire more out of perpendicular and into a bowed line, whereby they are less adapted to sustain the vertical stress of the load, in other words, the tire is caused to depart from the "cushion" type.

In carrying my invention into effect in the embodiment thereof which I have selected for the purpose of illustration and description in this specification, I provide a tubular tire body, or carcass, 17, having a substantially cylindrical interior space, formed of one or more layers of suitable rubberized fabric.

Exterior to the carcass or tire body is the usual casing or shoe 26 of the tire. This may be formed of rubber or the like in the usual or any suitable manner, and connected to the carcass as is well understood in the art.

The tire body is preferably thickened between the top and bottom portions thereof, as shown in Fig. 1.

The tire may be provided with the usual beads 18 for engagement with the wheel rim, or may be secured to said rim in any suitable manner. The tire is also provided with a circumferentially extending shoulder 29 on each side, which may if desired contain strengthening strips 21. The purpose and function of the shoulders 29 has already been pointed out.

It should be noted that the shoulders 29 are normally not in contact with the lower surface of the turned in edge of the rim, but that under load or shock the rim may descend so as to abut on the shoulders.

The tire may also be provided with the usual cushioning strips 19 and breaker strips 20, these particulars however forming no part of my present invention.

My invention more particularly resides in the special form which is given to this casing or shoe 26, and especially the bearing surface thereof (see Fig. 3.) This outer or bearing surface is provided with two lateral ridges or treads 22, (Fig. 1) extending circumferentially therearound, and these treads are connected at suitable intervals by arched connecting ridges 23, (Fig. 3) and these again by circumferentially extending key-arches 24. The external lateral surfaces of said treads 22 merge smoothly into the lateral surfaces of the tire, as shown in the drawings, presenting a slightly curved line in cross section, but with no marked recess or groove. The said treads are interrupted at intervals (see Fig. 3) by transverse grooves or openings 25, which are preferably staggered with relation to each other as shown. It must be understood that the treads 22, arches 23 and key-arches 24 are preferably integral with each other and with the casing or shoe 26.

It will be seen that the surface of the tire is divided by the arches 23 and 24 into hollowed sections 27, which are bounded laterally by the treads 22, but which open out through the grooves 25.

In the modification of my invention shown in Fig. 7 the transverse connecting arches 30 do not extend at right angles to the treads 22, but are V-shaped as shown.

The operation of my invention and its advantages over the forms of tire previously known will be obvious from what has been above set forth and need not be here repeated.

It will be understood that various modifications of the construction hereinabove described can be made without departing from the spirit or scope of my invention.

Having thus described my invention, what I claim as new and desire to secure by Letters Patent, is as follows:

1. A pneumatic tire for vehicles provided with a projecting tread extending circumferentially around the same at each side of the outer or bearing surface thereof, the exterior lateral surfaces of said treads merging smoothly into the lateral surfaces of the tire, the bearing surface of the tire being concave or arched away from the road bed upon which the treads run, and transverse ridges of arched form extending across between said treads.

2. A pneumatic tire for vehicles provided with a projecting tread extending circumferentially around the same at each side of the outer or bearing surface thereof, the exterior lateral surfaces of said treads merging smoothly into the lateral surfaces of the tire, said bearing surface being concave or arched away from the road bed upon which the treads run, transverse ridges of concave or arched form extending across between said treads, and longitudinally extending ridges of concave or arched form lying between said treads and said transverse arched ridges.

3. A pneumatic tire for vehicles provided with a projecting tread extending circumferentially around the same at each side of the outer or bearing surface thereof, the exterior lateral surfaces of said treads merging smoothly into the lateral surfaces of the tire, said bearing surface being concave or arched away from the road bed upon which the treads run, transverse ridges of concave or arched form extending across between said treads and longitudinally extending ridges of concave or arched form lying between said treads and said transverse concave or arched ridges, said lateral circumferentially extending ridges being interrupted at intervals by transverse notches or grooves.

4. The combination with a vehicle wheel provided with a rim, of a pneumatic tire provided with circumferentially extending shoulders located outside of said rim and adapted to normally be out of contact therewith but to come into contact therewith when the tire is under load, a projecting tread extending circumferentially around the same at each side of the outer or bearing surface thereof, said treads being in substantial alinement with said shoulders respectively, and the exterior lateral surfaces of said treads merging smoothly into the lateral surfaces of the tire, and said bearing surface being concave or arched away from the road bed upon which the treads run, and transverse ridges of concave or arched form extending across between said treads.

5. The combination with a vehicle wheel provided with a rim, of a pneumatic tire provided with circumferentially extending shoulders located outside of said rim and adapted to normally be out of contact therewith but to come into contact therewith when the tire is under load, a projecting tread extending circumferentially around the same at each side of the outer or bearing surface thereof, said treads being in substantial alinement with said shoulders respectively, and the exterior lateral surfaces of said treads merging smoothly into the lateral surfaces of the tire, and said bearing surface being concave or arched away from the road bed upon which the treads run, transverse ridges of concave or arched form extending across between said treads, and longitudinally extending ridges of concave or arched form lying between said treads and said transverse concave or arched ridges.

6. The combination with a vehicle wheel provided with a rim, of a pneumatic tire provided with circumferentially extending shoulders located outside of said rim and adapted to normally be out of contact therewith but to come into contact therewith when the tire is under load, a projecting tread extending circumferentially around the same at each side of the outer or bearing surface thereof, said treads being in substantial alinement with said shoulders respectively, and the exterior lateral surfaces of said treads merging smoothly into the lateral surfaces of the tire, and said bearing surface being concave or arched away from the road bed upon which the treads run, transverse ridges of concave or arched form extending across between said treads, and longitudinally extending ridges of concave or arched form lying between said treads and said transverse ridges, said lateral circumferentially extending ridges being interrupted at intervals by transverse notches or grooves.

7. The combination with a vehicle wheel provided with a rim, of a pneumatic tire having a lateral thickened portion midway between the top and bottom thereof and having a projecting tread extending circumferentially around the same at each side of the outer or bearing surface thereof, the exterior lateral surfaces of said treads merging smoothly into the lateral surfaces of the tire, said bearing surface being concaved or arched away from the road bed upon which the treads run, and transverse ridges of concave or arched form extending across between said treads.

8. The combination with a vehicle wheel provided with a rim, of a pneumatic tire having a lateral thickened portion midway between the top and bottom thereof and having a projecting tread extending circumferentially around the same at each side of the outer or bearing surface thereof, the exterior lateral surfaces of said treads merging smoothly into the lateral surfaces of the tire, said bearing surface being concave or arched away from the road bed upon which the treads run, transverse ridges of concave or arched form extending across between said treads, and longitudinally extending ridges of concaved or arched form lying between said treads and said transverse arched ridges.

9. The combination with a vehicle wheel provided with a rim, of a pneumatic tire having a lateral thickened portion midway between the top and bottom thereof and having a projecting tread extending circumferentially around the same at each side of the outer or bearing surface thereof, the exterior lateral surfaces of said treads merging smoothly into the lateral surfaces of the tire, said bearing surface being concave or arched away from the road bed upon which the treads run, transverse ridges of concave or arched form extending across between said treads and longitudinally extending ridges of concave or arched form lying between said treads and said transverse arched ridges, said lateral circumferentially extending ridges being interrupted at intervals by transverse notches or grooves.

10. The combination with a vehicle wheel provided with a rim, of a pneumatic tire having a lateral thickened portion midway between the top and bottom thereof and having circumferentially extending shoulders located below said rim, and a projecting tread extending circumferentially around the same at each side of the outer or bearing surface thereof, said treads being in substantial alinement with said shoulders respectively, and the exterior lateral surfaces of said treads merging smoothly into the lateral surfaces of the tire, said bearing surface being concave or arched away from the road bed upon which the treads run, and transverse ridges of concave or arched form extending across between said treads.

11. The combination with a vehicle wheel provided with a rim, of a pneumatic tire having a lateral thickened portion midway between the top and bottom thereof and having circumferentially extending shoulders located below said rim, and a projecting tread extending circumferentially around the same at each side of the outer or bearing surface thereof, said treads being in substantial alinement with said shoulders respectively, and the exterior lateral surfaces of said treads merging smoothly into the lateral surfaces of the tire, said bearing surface being concave or arched away from the road bed upon which the treads run, transverse ridges of concave or arched form extending across between said treads, and longitudinally extending ridges of concave or arched form lying between said treads and said transverse concave or arched ridges.

12. The combination with a vehicle wheel provided with a rim, of a pneumatic tire having a lateral thickened portion midway between the top and bottom thereof and having circumferentially extending shoulders located below said rim, and a projecting tread extending circumferentially around the same at each side of the outer or bearing surface thereof, said treads being in substantial alinement with said shoulders respectively, and the exterior lateral surfaces of said treads merging smoothly into the lateral surfaces of the tire, said bearing surface being concave or arched away from the road bed upon which the treads run, transverse ridges of concave or arched form extending across between said treads, and longitudinally extending ridges of concave or arched form lying between said treads and said transverse ridges, said lateral circumferentially extending ridges being interrupted at intervals by transverse notches or grooves.

In witness whereof I have hereunto signed my name this 2d day of September 1913, in the presence of two subscribing witnesses.

OSCAR MUSSINAN.

Witnesses:
 EDMOND CONGAR BROWN,
 ANNA DUFFY.